US008265681B2

(12) United States Patent
Wang et al.

(10) Patent No.: US 8,265,681 B2
(45) Date of Patent: Sep. 11, 2012

(54) OUTER LOOP TRANSMIT POWER CONTROL IN WIRELESS COMMUNICATION SYSTEMS

(75) Inventors: Xiaohui Wang, Lund (SE); Jonas Ohlsson, Malmö (SE); Magnus Öst, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1178 days.

(21) Appl. No.: 12/044,185

(22) Filed: Mar. 7, 2008

(65) Prior Publication Data

US 2009/0069042 A1     Mar. 12, 2009

Related U.S. Application Data

(60) Provisional application No. 60/971,740, filed on Sep. 12, 2007.

(51) Int. Cl.
| H04B 7/185 | (2006.01) |
| H04B 7/00 | (2006.01) |
| H04B 1/00 | (2006.01) |
| H04B 17/00 | (2006.01) |
| H04B 1/38 | (2006.01) |
| H04B 15/00 | (2006.01) |
| H04W 4/00 | (2009.01) |
| H04K 1/02 | (2006.01) |
| H04L 27/10 | (2006.01) |

(52) U.S. Cl. .... 455/522; 455/501; 455/63.1; 455/67.11; 370/318; 370/332; 370/333; 375/219; 375/284; 375/285; 375/296

(58) Field of Classification Search .................. 455/522, 455/501, 63.1, 67.11; 370/318, 332, 333; 375/219, 284, 285, 296

See application file for complete search history.

(56) References Cited

U.S. PATENT DOCUMENTS 6,944,470 B2     9/2005   Qian et al.
(Continued)

FOREIGN PATENT DOCUMENTS

EP   1981180 A1   1/2007
(Continued)

OTHER PUBLICATIONS

Chockalingam, A. et al. "Closed-Loop Power Control Performance in a Cellular CDMA System." Asilomar '95, p. 362, 29th Asilomar Conference on Signals, Systems and Computers (2-Volume Set), 1995.

(Continued)

*Primary Examiner* — Bobbak Safaipour
(74) *Attorney, Agent, or Firm* — Coats & Bennett, P.L.L.C.

(57) ABSTRACT

Outer-loop power control methods and apparatus are disclosed. In an exemplary embodiment, a short-term block error rate is measured for a received signal, and a coarse adjustment to a target signal-to-interference ratio (SIR) is calculated as a function of the short-term block error rate, a target block error rate, and a first loop tuning parameter. In some embodiments, a fine adjustment to the target SIR is also calculated, as a function of a smoothed block error rate, the target block error rate, and a second loop tuning parameter. The coarse adjustment provides quick responsiveness to received block errors, while the fine adjustment moderates the coarse adjustments by accounting for a longer-term view of the received block error rate. The target SIR adjustments disclosed herein may be computed in each of several iterations of an outer-loop power control loop.

28 Claims, 6 Drawing Sheets

U.S. PATENT DOCUMENTS

| | | | |
|---|---|---|---|
| 6,963,553 | B1 | 11/2005 | Cordier et al. |
| 6,965,780 | B1 | 11/2005 | Monogioudis et al. |
| 6,973,326 | B2 | 12/2005 | Noh |
| 7,010,321 | B2 | 3/2006 | Chi et al. |
| 7,016,699 | B2 | 3/2006 | Koo et al. |
| 7,197,327 | B2 | 3/2007 | Koo et al. |
| 7,266,385 | B2 | 9/2007 | Koo et al. |
| 2002/0058482 | A1 | 5/2002 | Agin et al. |
| 2002/0187802 | A1 | 12/2002 | Agin et al. |
| 2003/0054849 | A1 | 3/2003 | Koo et al. |
| 2003/0081692 | A1* | 5/2003 | Kwan et al. ............ 375/295 |
| 2003/0166407 | A1 | 9/2003 | Qian et al. |
| 2004/0063453 | A1 | 4/2004 | Koo et al. |
| 2004/0121794 | A1 | 6/2004 | Koo et al. |
| 2004/0137860 | A1 | 7/2004 | Oh et al. |
| 2004/0157633 | A1 | 8/2004 | Ogura |
| 2004/0157636 | A1 | 8/2004 | Koo et al. |
| 2004/0202242 | A1 | 10/2004 | Lin et al. |
| 2005/0069044 | A1* | 3/2005 | Iacono et al. ............ 375/259 |
| 2005/0085191 | A1* | 4/2005 | Iacono et al. ............ 455/67.11 |
| 2005/0085255 | A1 | 4/2005 | Andersson et al. |
| 2005/0143112 | A1 | 6/2005 | Jonsson |
| 2005/0143120 | A1* | 6/2005 | Cave et al. ............ 455/522 |
| 2005/0215276 | A1* | 9/2005 | Koo et al. ............ 455/522 |
| 2005/0239489 | A1 | 10/2005 | Qian et al. |
| 2006/0003789 | A1 | 1/2006 | Murata et al. |
| 2006/0014487 | A1* | 1/2006 | Jonsson ............ 455/1 |
| 2006/0058055 | A1* | 3/2006 | Shintani ............ 455/522 |
| 2006/0084459 | A1* | 4/2006 | Phan et al. ............ 455/522 |
| 2006/0092887 | A1* | 5/2006 | Iacono et al. ............ 370/335 |
| 2006/0099985 | A1 | 5/2006 | Whinnett et al. |
| 2006/0148508 | A1* | 7/2006 | Jeong et al. ............ 455/522 |
| 2006/0178163 | A1 | 8/2006 | Richards et al. |
| 2006/0189342 | A1 | 8/2006 | Chi et al. |
| 2006/0240826 | A1 | 10/2006 | Shinozaki |
| 2006/0252451 | A1 | 11/2006 | Cho et al. |
| 2007/0042718 | A1* | 2/2007 | Camacho et al. ............ 455/69 |
| 2007/0173278 | A1 | 7/2007 | Yoon et al. |
| 2007/0173281 | A1* | 7/2007 | Koo et al. ............ 455/522 |
| 2007/0197252 | A1* | 8/2007 | Watanabe et al. ............ 455/522 |
| 2007/0218933 | A1* | 9/2007 | Lopez Medrano et al. ... 455/522 |
| 2007/0218937 | A1* | 9/2007 | Koo et al. ............ 455/522 |
| 2007/0248190 | A1 | 10/2007 | Nilsson |
| 2007/0281729 | A1* | 12/2007 | Koo et al. ............ 455/522 |
| 2010/0056169 | A1* | 3/2010 | Koo et al. ............ 455/450 |
| 2010/0275103 | A1* | 10/2010 | Okumura ............ 714/776 |

FOREIGN PATENT DOCUMENTS

| | | |
|---|---|---|
| WO | 01/05055 | 1/2001 |
| WO | 2004/025973 | 3/2004 |

OTHER PUBLICATIONS

Naghian, S. et al. "Dynamic Step-Size Power Control in UMTS." The 13th IEEE International Symposium on Personal, Indoor and Mobile Radio Communications, 2002. Sep. 15-18, 2002, vol. 4, pp. 1606-1610.

Nuaymi, L. et al. "A Power Control Algorithm for 3G WCDMA System." Internet paper available at: http://www2.ing.unipi.it/ew2002/proceedings/177.pdf.

Qian, L. et al. "Optimal Distributed Power Control in Cellular Wireless Systems." Internet paper available at: http://citeseer.ist.psu.edu/cache/papers/cs/25642/http:zSzzSzwww.eden.rutgers.eduzSz~ljqianzSzallerton.pdf/qian00optimal.pdf.

Rintamaki, M. "Adaptive Power Control in CDMA Cellular Communication Systems." Dissertation for the degree of Doctor of Science in Technology, Helsinki University of Technology, Signal Processing Laboratory. Espoo, Finland 2005. Available at: http://lib.tkk.fi/Diss/2005/isbn9512278987/isbn9512278987.pdf.

Wang, L. et al. "Adaptive Power Control using Channel State Information Gradient for Mobile Radio Systems." Proceedings of the 20th International Conference on Advanced Information Networking and Applications (AINA'06). 2006, vol. 1, pp. 915-919.

Harte, L. "Power Control." CDMA IS-95 for Cellular and PCs: Technology, Applications, and Resource Guide. McGraw-Hill 2001, p. 60.

* cited by examiner

OUTER LOOP TRANSMIT POWER CONTROL IN WIRELESS COMMUNICATION SYSTEMS

CROSS REFERENCE TO RELATED APPLICATIONS

This application claims priority under 35 U.S.C. §119(e) from Provisional Patent Application No. 60/971,740, filed Sep. 12, 2007, the entire contents of which are incorporated herein by reference.

TECHNICAL FIELD

The present invention relates generally to wireless communication systems. More particularly, the present invention relates to systems and methods for outer loop control of transmission power within a wireless communication system.

BACKGROUND

In most current Code Division Multiple Access (CDMA) systems, such as systems conforming to the Wideband CDMA (W-CDMA) specifications promulgated by the $3^{rd}$-Generation Partnership Project (3GPP), transmit power control is accomplished using two simultaneously operating control loops: an inner and outer power control loop. In a typical inner-loop power control procedure, a signal quality measure for a received signal, such as signal-to-interference ratio (SIR), is compared to a target level, to generate transmit power control (TPC) commands for instructing the transmitter to either increase or decrease its transmit power. The outer control loop, which generally operates more slowly than the inner loop, adjusts the targeted signal quality measure so that a desired quality of service (QoS) is achieved. For instance, an SIR target employed by the inner loop may be adjusted by the outer loop to maintain a designed block error rate (BLER) or frame error rate (FER). The general operation of inner- and outer-loop power control is well known, and is described, for instance, in U.S. Patent Application Publication No. 2005/0143112 by Jonsson, the entire contents of which are incorporated herein by reference.

In a dynamic radio environment, the target SIR must be continuously adjusted to maintain the target BLER under changing signal propagation conditions. Further, the target SIR must be adjusted to accommodate changes of the BLER target. Rapid convergence of the power control loop to the target BLER is highly desired, since excessive transmit power causes interference to other communications, while transmissions at below the optimal level result in excessive error rates at the target receiver. However, conventional control loops designed for quick response often exhibit large jumps in transmit power, thus wasting power and/or missing the BLER target. These control loops may be stabilized, but the price for the stability measures used in existing power control loops is generally a slow convergence to the SIR target and excessive transmit power.

SUMMARY

Disclosed herein are methods and apparatus for adjusting a target signal-to-interference ratio (SIR) for use in controlling transmitted power of a signal received from a remote transmitter. In an exemplary embodiment, a short-term block error rate is measured for a received signal, and a coarse adjustment to a target SIR is calculated as a function of the short-term block error rate, a target block error rate, and a first loop tuning parameter. In some embodiments, a fine adjustment to the target SIR is also calculated, as a function of a smoothed block error rate, the target block error rate, and a second loop tuning parameter. The coarse adjustment provides quick responsiveness to received block errors, while the fine adjustment moderates the coarse adjustments by accounting for a longer-term view of the received block error rate. The target SIR adjustments may be calculated and applied for each of several iterations of an outer-loop power control loop. The disclosed methods thus provide techniques for improving the responsiveness and accuracy of outer-loop power control in wireless communication systems.

In another exemplary method for adjusting a target SIR, a coarse tuning mode comprises two or more iterations of a coarse power control loop. In each iteration, a short-term block error rate, a target block error rate, and a first loop tuning parameter are used to calculate a coarse SIR adjustment to the target SIR. The value of the first loop tuning parameter is varied in one or more steps from an initial value to a final value, in response to detecting one or more cyclic redundancy check (CRC) errors in the received signal. These adjustments to the first loop tuning parameter result in progressively smaller adjustments to the target SIR as the coarse power control loop approaches convergence to the optimal target SIR. Upon reaching the final value for the first loop tuning parameter, control transitions to a fine tuning mode.

Variations of the above-described methods are also disclosed, as are apparatus configured to carry out one or more of the outer-loop power control techniques described herein.

DETAILED DESCRIPTION

Figure 1:
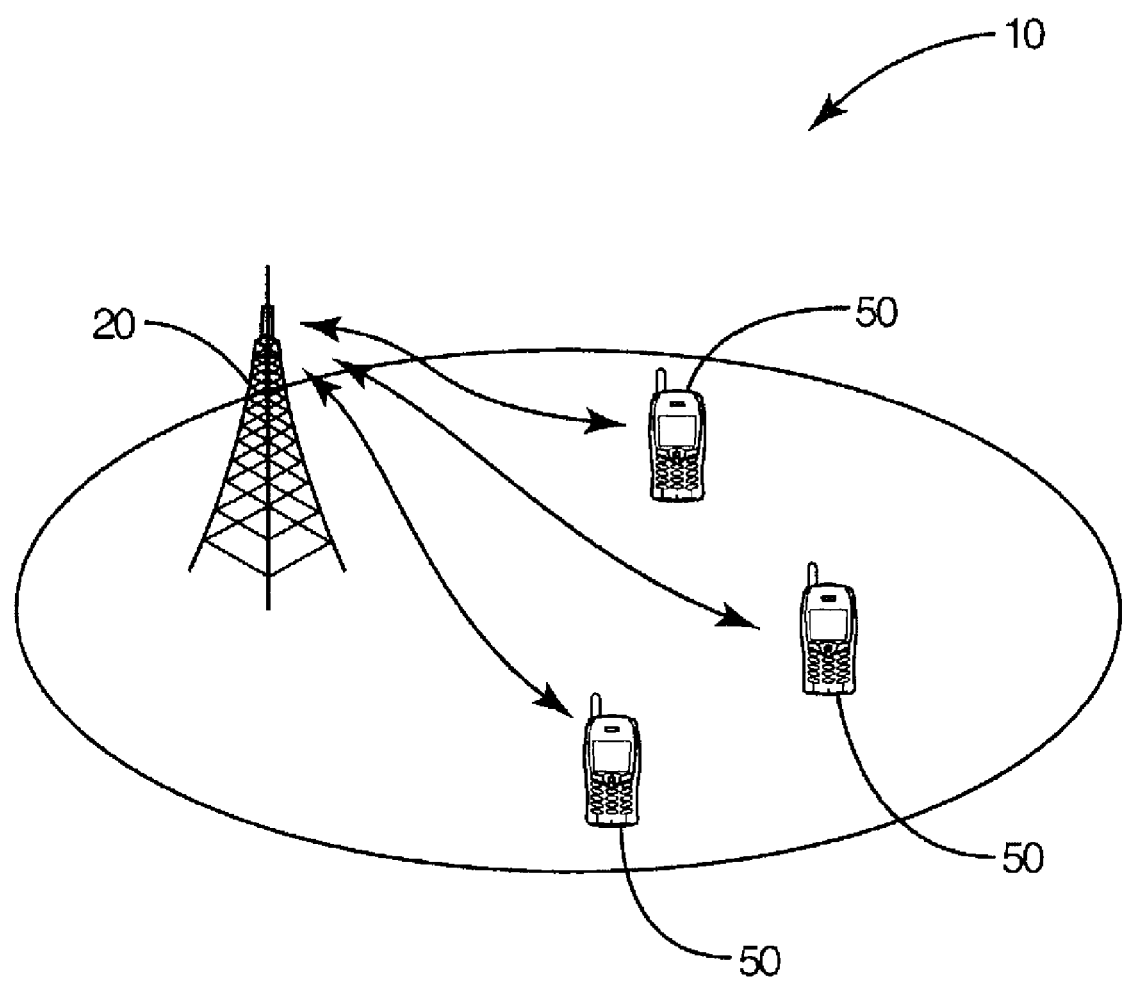
FIG. 1 is a schematic diagram of a mobile communication network.

Referring now to the drawings, the present invention will be described in the context of a Third Generation (3G) mobile communication network, such as a UMTS network. Those skilled in the art will appreciate, however, that the present invention is applicable to systems implementing other standards. Therefore, the description should not be construed as limiting the present invention to UMTS networks.

FIG. 1 presents a simplified illustration of a mobile communication network 10 for supporting wireless communications by a plurality of mobile terminals 50. While FIG. 1 shows a single base station 20 communicating with the mobile terminals 50, those skilled in the art will appreciate that a typical communication network 10 comprises many base stations 20. The base station 20 transmits data to the mobile terminals 50 over one or more downlink channels, and receives data from the mobile terminals 50 over one or more uplink channels. The downlink and uplink channels may comprise dedicated channels, common channels, or a mixture thereof. In a current release of the UMTS standard, the physical channels for the uplink include the dedicated physical control channel (DPCCH), the dedicated physical data channel (DPDCH), the enhanced dedicated physical control channel (E-DPCCH), the enhanced dedicated physical data channel (E-DPDCH), and the high-speed dedicated physical control channel (HS-DPCCH).

Base station 20 simultaneously controls the transmit power of the mobile terminals 50 on the DPCCH, DPDCH, E-DPCCH, E-DPDCH, and HS-DPCCH. An inner power control loop sets the transmit power of the mobile terminals 50 on the DPCCH by comparing the signal-to-interference ratio (SIR) of the received DPCCH signal to an SIR target. The SIR target is set by outer-loop power control and can be driven by the block error rate (BLER) on the DPDCH, or the number of retransmissions of the E-DPDCH. A mobile terminal's transmit power on each of the DPDCH, E-DPCCH, E-DPDCH, and HS-DPCCH is set relative to the transmit power of the DPCCH. Thus, a single power control mechanism controls the transmit power of the mobile terminal 50 on all of the uplink physical channels.

A similar mechanism may be employed to control the transmit power of the base station 20. For instance, 3GPP TS 25.214, "Physical Layer Procedures (FDD) (Release 6)", ver. 6.3.0 (September 2004) specifies downlink power control procedures. In particular, TS 25.214 specifies that a receiving mobile terminal 50 should generate TPC commands based on a comparison between a measured SIR and a SIR reference, or target SIR. If the measured SIR is greater than the target, an "DOWN" TPC command is generated and transmitted to the base station 20; if the measured SIR is less than the target, a "UP" TPC command is transmitted. Base station 20 adjusts its transmit power accordingly.

Many conventional outer-loop power control procedures are variants of a "jump algorithm," in which the SIR target is gradually reduced if no block error is detected, and increased when a block error is detected. Typically, a block error is detected using a cyclic redundancy check (CRC) value included in the received block. In most of these systems, a step increase in SIR in response to an error is much larger than downward steps:

$$SIR_{target}(k+1) = SIR_{target}(k) + SIR_{step}, \text{ if block error, and} \quad (1)$$

$$SIR_{target}(k+1) = SIR_{target}(k) + SIR_{step} \cdot \frac{BLER_{target}}{1 - BLER_{target}},$$

if no error.

In the preceding expressions, k is a index corresponding to a time interval, such as a time slot or frame, $SIR_{target}(k)$ is the target SIR for time k, $SIR_{step}$ is a pre-determined increment value, and $BLER_{target}$ is the targeted BLER.

Those skilled in the art will appreciate that the response of an outer-loop power control procedure employing the jump algorithm of Equation (1) can be quite slow, particularly for low BLER targets. For the above algorithm, downward steps are much smaller than upward steps. For instance, if $BLER_{target}=0.01$, then the downward adjustments in the target SIR are approximately 1% of the upward adjustments. As a result, an algorithm like Equation (1) wastes system capacity, since the controlled signal is transmitted at a higher power than necessary for the majority of the time.

A well-behaved outer-loop power control algorithm that provides finer and more responsive control of the target SIR, thus reducing wasted capacity, can be described as follows:

$$SIR_{target}(k+1) = SIR_{target}(k) + ADJ_{coarse}(k) + ADJ_{fine}(k), \quad (2)$$

where $$ADJ_{coarse}(k) = 2^{-K1} \cdot SIR_{target}(k) \cdot [CER(k) - BLER_{target}], \quad (3)$$

and $$ADJ_{fine}(k) 2^{-K3} \cdot ADJ_{fine}(k) + 2^{-K2} \cdot [BLER_{filtered}(k) - BLER_{target}]. \quad (4)$$

Using the algorithm of Equation (2), the outer control loop calculates an adjustment to the target SIR in two parts, a coarse part, $ADJ_{coarse}(k)$, and a fine part, $ADJ_{fine}(k)$. The coarse part of the adjustment is calculated as a function of the target SIR for the prior interval, $SIR_{target}(k)$; an exponential tuning parameter, $2^{-K1}$, where K1 may be a predetermined value selected according to the configuration of a particular cell and/or the configuration of the controlled channel; and the difference between a current, or short-term error rate, $CER(k)$, and the targeted block error rate, $BLER_{target}$. The short-term error rate $CER(k)$ represents a block error rate for the most recent transmission time interval (TTI), e.g., the most recently received slot or frame. The fine part of the adjustment, $ADJ_{fine}(k)$, represents the accumulation of the difference between a filtered block error rate, which corresponds to the block error rate observed over a longer period of time than a single TTI, and the target block error rate. Thus, the difference between the filtered BLER and the target BLER is scaled by a second tuning parameter, $2^{-K2}$, and added to a prior fine adjustment value scaled by a third tuning parameter, $2^{-K3}$. Again, values for K2 and K3 may be pre-selected to optimize performance of the outer control loop for a given cell and/or channel configuration.

Those skilled in the art will appreciate that the coarse part of the target SIR adjustment is more immediately responsive to block errors detected in the received signal. The short-term error rate $CER(k)$ may correspond to a single TTI, which may comprise one or a few blocks. In the extreme case, where $CER(k)$ corresponds to a single block, its value is either "1", indicating a CRC error, or "0", indicating an error-free block. In embodiments where, for example, $CER(k)$ corresponds to four blocks, $CER(k)$ may take on several values: 0, 0.25, 0.5, 0.75, and 1. In any event, the difference between this "momentary" block error rate and the target block error rate is used to compute a portion of the adjustment to the target SIR. When there are no current block errors ($CER(k)=0$), then this portion of the adjustment is a small reduction in the target SIR, proportional to the target BLER. When there are one or more block errors, the coarse part of the adjustment is an increase in target SIR. For small target BLERs, this upward adjustment can be many times the corresponding downward adjustment.

The responsiveness of the outer control loop to current block errors may be moderated or enhanced by the fine part of the target SIR adjustment, $ADJ_{fine}(k)$. This portion of the adjustment accounts for longer-term differences between the observed BLER and the target BLER. Thus, if the observed BLER over a period of time has been lingering above the target BLER, then the accumulated difference captured by $ADJ_{fine}(k)$ will be positive. In this case, the fine part of the target SIR adjustment will enhance upward coarse adjustments triggered by one or more CRC errors, and reduce downward coarse adjustments made when no CRC errors are currently observed. Conversely, if the observed BLER over a period of time is below the target BLER, then the accumulated difference captured by $ADJ_{fine}(k)$ will be negative. In this case, the fine part of the target SIR adjustment will enhance downward coarse adjustments, while tempering upward coarse adjustments triggered by a CRC error.

Those skilled in the art will appreciate that the responsiveness of the outer-loop power control algorithm described in Equations (2) to (4) may be tuned by adjusting the values of the loop tuning parameters K1, K2, and K3. As noted above, the precise values for the loop tuning parameters may be pre-selected according to a cell configuration or a channel configuration, or both. Further, as will be described in more detail below, the loop tuning parameters may be varied over time, to provide improved responsiveness of the power control loop to significant changes in channel conditions or target BLER.

Those skilled in the art will also understand that the time constant associated with the filtered block error rate, BLER$_{filtered}$(k), provides a further means for tuning the loop performance. The time constant for the filtered BLER may correspond to twenty transmission time intervals or more. In some embodiments, the time constant for the filtered BLER may vary as a function of the target BLER—for instance, a longer time constant may be used for a smaller target BLER.

Figure 2:
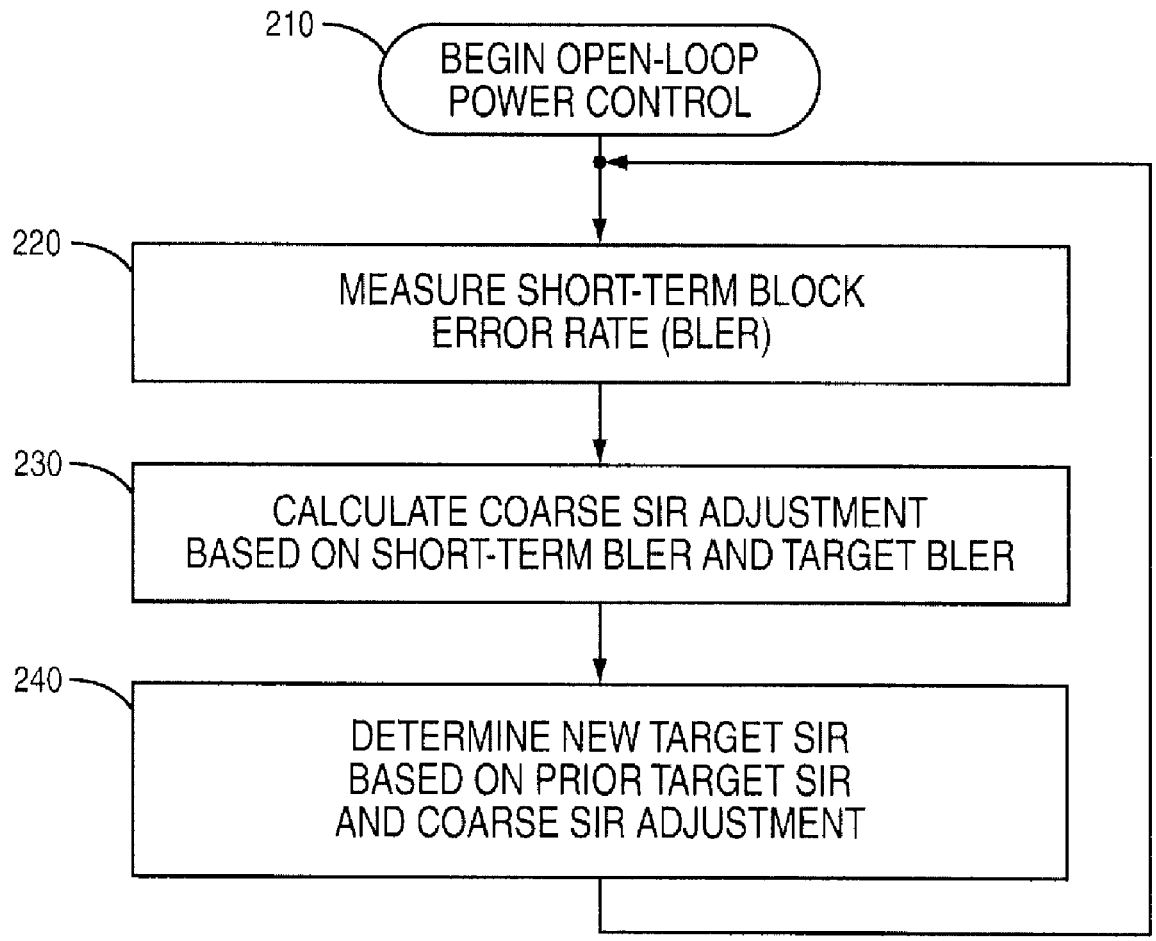
FIG. 2 is a flow diagram of an exemplary outer-loop power control procedure.

FIG. 2 illustrates an exemplary method for adjusting a target signal-to-interference ratio (SIR) for use in controlling transmitted power of a signal received from a remote transmitter. The illustrated method may be applied to downlink power control, in which case the method is implemented at a mobile terminal 50, or to uplink power control, in which case the method is implemented at a base station 20 and/or a control element in the wireless network infrastructure.

The outer-loop power control method of FIG. 2 begins at block 210. At block 220, a current block error rate (CER(k)) is measured. The current block error rate represents a short-term error rate, and may correspond to several blocks or frames, or only a single block. As noted above, in many embodiments a CRC value is used to detect a block error, although other error detection techniques may be used.

A coarse target SIR adjustment is calculated at block 230. In embodiments where the target SIR adjustment comprises two or more parts, as in Equation (2) above, the coarse SIR adjustment may represent the portion of the overall adjustment that is most immediately responsive to block errors. Thus, the coarse SIR adjustment is a function of the short-term block error rate (CER(k)), a target block error rate (BLER$_{target}$), and a first loop tuning parameter. The target block error rate here is a pre-determined value; determination of this value is discussed in more detail below.

At block 240, the coarse SIR adjustment is used to compute a new target SIR, for use in the next transmission time interval. Thus, in some embodiments, the coarse and fine SIR adjustments are simply added to a prior target SIR, such as the target SIR for the immediately prior time interval. The steps 220-240 may be repeated for each transmission time interval, to produce a series of target SIR values that may be used by an inner-loop power control loop to maintain the transmitter power of the remote transmitter at a level that results in a received block error rate that closely tracks the target BLER.

Figure 3:
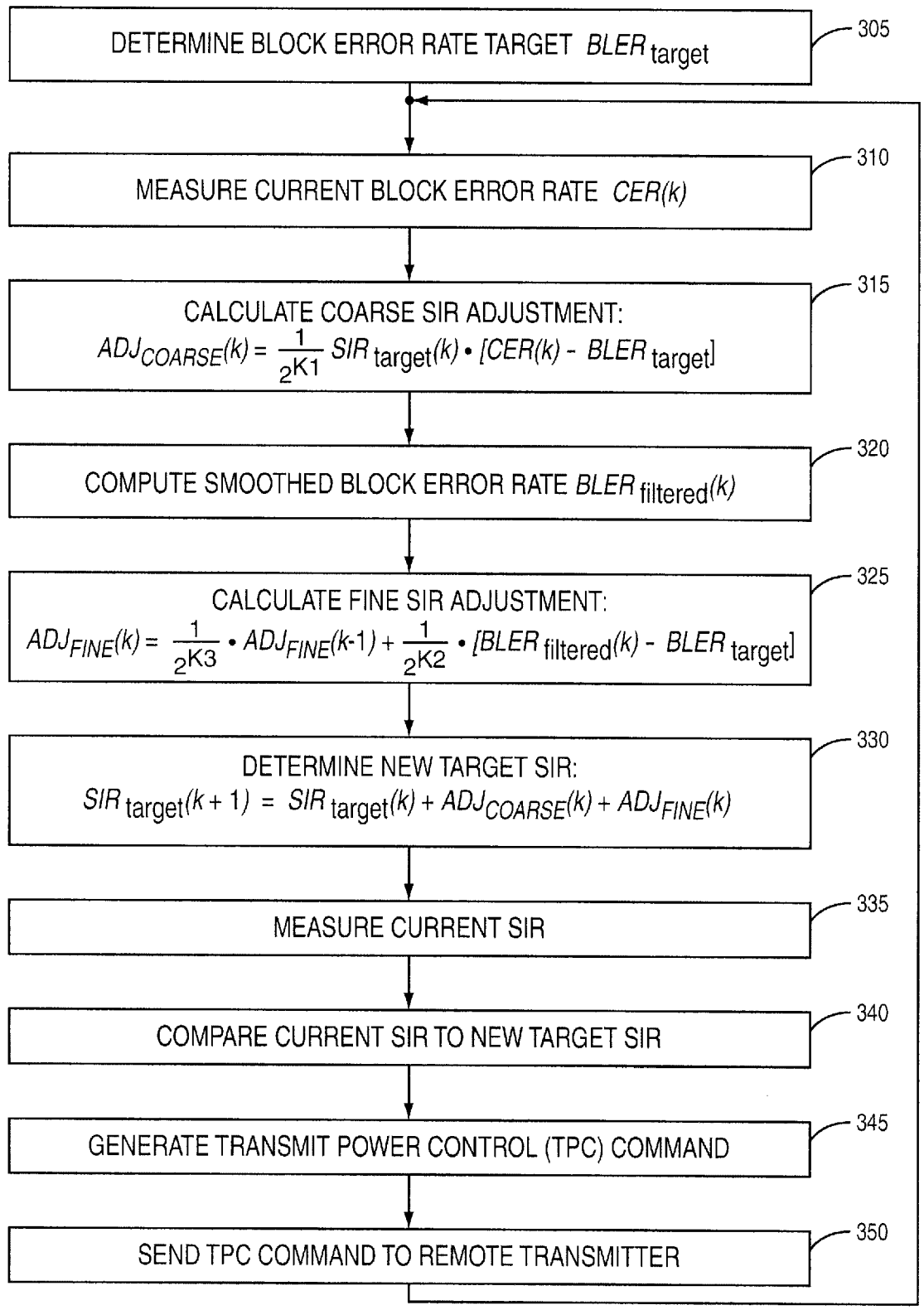
FIG. 3 is another flow diagram of an exemplary outer-loop power control procedure.

FIG. 3 illustrates another, more-detailed, method for adjusting a target signal-to-interference ratio (SIR) that may be used in some embodiments of the invention. As with the method illustrated in FIG. 2, the outer-loop power control method of FIG. 2 may be applied to downlink power control or to uplink power control.

At block 305, a target block error rate (BLER$_{target}$) is determined. The BLER target is usually chosen by higher layers in the system according to various criteria, which may include a desired quality-of-service, desired system throughput, and/or current system loading conditions. In some embodiments, a target block error rate may be signaled to a mobile terminal 50 by base station 20, for use in controlling the downlink transmit power.

At block 310, a current block error rate (CER(k)) is measured. Again, the current block error rate represents a short-term error rate, and may correspond to several blocks or frames, or only a single block. As noted above, in many embodiments a CRC value is used to detect a block error, although other error detection techniques may be used.

A coarse target SIR adjustment is calculated at block 315. The coarse SIR adjustment represents the portion of the overall adjustment that is most immediately responsive to block errors. Thus, the coarse SIR adjustment is a function of the short-term block error rate (CER(k)), the target block error rate (BLER$_{target}$), and a first loop tuning parameter. In some embodiments, the coarse SIR adjustment is calculated according to Equation (3), in which case the first loop tuning parameter is an exponential parameter $2^{-K1}$. The value of the loop tuning parameter may be selected to optimize loop performance for a particular cell or channel configuration, and may be varied over time, in some embodiments.

At block 320, a smoothed block error rate (BLER$_{filtered}$(k)) is computed. The smoothed block error rate represents the block error rate for a time interval longer than a single transmission time interval. Various methods for computing the smoothed block error rate may be used. The block error rates for several transmission time intervals up to and including the most recent TTI may be averaged, in some embodiments. In other embodiments, the smoothed block error rate may be computed as a weighted average of the short-term block error rate and a prior smoothed block error rate. For instance, the smoothed block error rate may be computed according to:

$$BLER_{filtered}(k) = \frac{1}{N} CER(k) + \frac{N-1}{N} BLER_{filtered}(k-1), \quad (5)$$

where N represents a pre-determined number of transmission time intervals over which the block error rate is effectively smoothed. As noted above, in some embodiments the time constant N may be a fixed parameter, while in others N may be varied according to circumstances. In particular, the value of N may be varied as a function of the target BLER, so that a smaller target BLER results in a larger value of N.

At block 325, a fine target SIR adjustment is calculated, as a function of the smoothed block error rate, the target block error rate, and a second loop tuning parameter. As explained above, because this term is computed as a function of a longer-term view of the block error rate, the fine target SIR adjustment can moderate the adjustments made by the coarse part, allowing finer adaptation of the target SIR and better tracking of the target BLER. In some embodiments, the fine target SIR adjustment may also include a term corresponding to a prior fine SIR adjustment, e.g., the fine SIR adjustment for the immediately previous transmission time interval, scaled by a third loop tuning parameter. Thus, in some embodiments, the fine SIR adjustment is calculated according to Equation (4), in which case the second and third loop tuning parameters are exponential parameters $2^{-K2}$ and $2^{-K3}$. As with the first tuning loop parameter, the value of these parameters may be selected to optimize loop performance for a particular cell and/or channel configuration. Furthermore, the values for one or both of these parameters may be changed over time, to tune the loop's responsiveness to changed conditions.

At block 330, the coarse and fine SIR adjustments are used to compute a new target SIR, for use in the next transmission time interval. Thus, in some embodiments, the coarse and fine SIR adjustments are simply added to the previous target SIR to obtain the new target SIR, as shown in Equation (2). Those skilled in the art will appreciate that the calculations of the coarse SIR adjustment and fine SIR adjustments, as well as the calculation of the new target SIR, are illustrated in FIG. 3 as separate steps only for the purposes of clarity. Thus, those skilled in the art will recognize that the order of several steps of the method of FIG. 3 may be altered, and that the various calculations may be combined into a single computation.

Once a new target SIR has been determined, it may be used to generate TPC commands to instruct the remote transmitter to increase or decrease its transmit power. Accordingly, the SIR for the current transmission time interval is measured at block 335. Those skilled in the art will appreciate that various estimation techniques may be used to obtain the "measured" SIR. SIR estimation is described in numerous publications, including, for example, U.S. Patent Application Publication 2006/0171449 by Lindoff et al., titled "Interference Estimation in the Presence of Frequency Errors."

At block 340, the measured current SIR is compared to the new target SIR to determine whether the transmit power should be increased or lowered. Depending on the result of the comparison, one or more transmit power control commands are generated at block 345, and sent to the remote transmitter at block 350. Thus, in some embodiments, an "UP" command is transmitted to the remote transmitter if the measured SIR falls below the target, while a "DOWN" command is transmitted if the measured SIR exceeds the target. The process may be repeated indefinitely by looping back to block 315, measuring the short-term block error rate and current SIR for a new transmission interval, and repeating the target SIR adjustments with the new results.

As noted above, the loop tuning parameters of the outer loop control algorithm may be adjusted during operation to affect the responsiveness of the loop. In some embodiments of the present invention, these tuning loop parameters are adjusted in an orderly manner to permit rapid convergence of the target SIR to near the optimal level using relatively large steps in a coarse tuning mode, and fine tracking of the target BLER in a fine tuning mode.

In one embodiment, for instance, Equations (2)-(4) are used for the final, fine tuning mode. In this mode, the loop tuning parameters K1, K2, and K3 have values $K1_{fine}$, $K2_{fine}$, and $K3_{fine}$. These values, as explained above in reference to the fine tuning method illustrated by FIG. 3, are selected to provide a desired balance between fine tracking of the target BLER and responsiveness of the loop. In some circumstances, however, these fine tuning parameter values may not provide sufficient responsiveness for adapting to changed conditions. For instance, increased loop responsiveness may be desired in the event that the target BLER changes substantially, or if the channel conditions drastically. The latter might occur, for instance, when a subscriber terminal moves from indoors to outdoors.

A mobile terminal 50 or base station 20 may be configured to detect one or more of these triggering events, in response to which an even quicker convergence of the target SIR to the correct value is desired. In response to this triggering event (or upon the first initiation of transmit power control), a multi-step process for "tuning" the target SIR may be employed. In an initial coarse tuning mode, rapid convergence can be achieved by varying the parameters. In one or more embodiments, the fine SIR adjustment discussed above may be ignored during coarse tuning mode, and the loop tuning parameter for the coarse SIR adjustment may be set to an initial value that generates larger adjustment steps and faster convergence to a target SIR near the optimal level.

For instance, the coarse adjustment $ADJ_{coarse}(k)$ of Equation (3) may be used in a coarse tuning mode, where K1 is initialized to a initial value $K1_{initial}$. For faster convergence, $K1_{initial}$ should be smaller than the fine tuning value $K1_{fine}$; in some embodiments, $K1_{initial}$ differs from $K1_{fine}$ by some integer offset. The coarse adjustment calculated with Equation (3) may be used for several transmission time intervals, during which time the SIR adjustments are relatively large.

Assuming that the transmit power is initially set at a level higher than needed, convergence of the target SIR to a level near the optimal level may be detected at the occurrence of the first CRC error. Upon detection of this CRC error, the step size of subsequent target SIR adjustments is reduced by adjusting the value of the loop tuning parameter. In an embodiment using a coarse adjustment calculated with Equation (2), then the loop tuning parameter may be adjusted by simply incrementing K1. This may be repeated, upon subsequent CRC errors, until the loop tuning parameter reaches its final value, which is the value used for fine tuning mode. At this point, the target SIR level has reached a point at which finer tuning is required. The outer-loop power control process thus transitions to a fine-tuning mode.

In the fine tuning mode, the values of one or more loop tuning parameters may be adjusted in a similar manner, to gradually trade loop responsiveness for fine tracking ability. For example, in embodiments where the fine tuning adjustment of Equation (4) is used, the second loop tuning parameter $2^{-K2}$ may be adjusted over time, in a gradual transitioning from the coarse tuning mode to the "final" fine tuning mode. As with the first loop tuning parameter, an initial value for K2 may be selected. This initial value, $K2_{initial}$, may be selected to differ from the final value, $K2_{fine}$, by some integer offset. In such an embodiment, the value of K2 may be incrementally adjusted, upon each occurrence of a CRC error, until the final value $K2_{fine}$ is reached. At this point, a steady-state fine tuning mode, such as was illustrated in FIG. 3, is maintained, until a new triggering event is detected.

Figure 4:
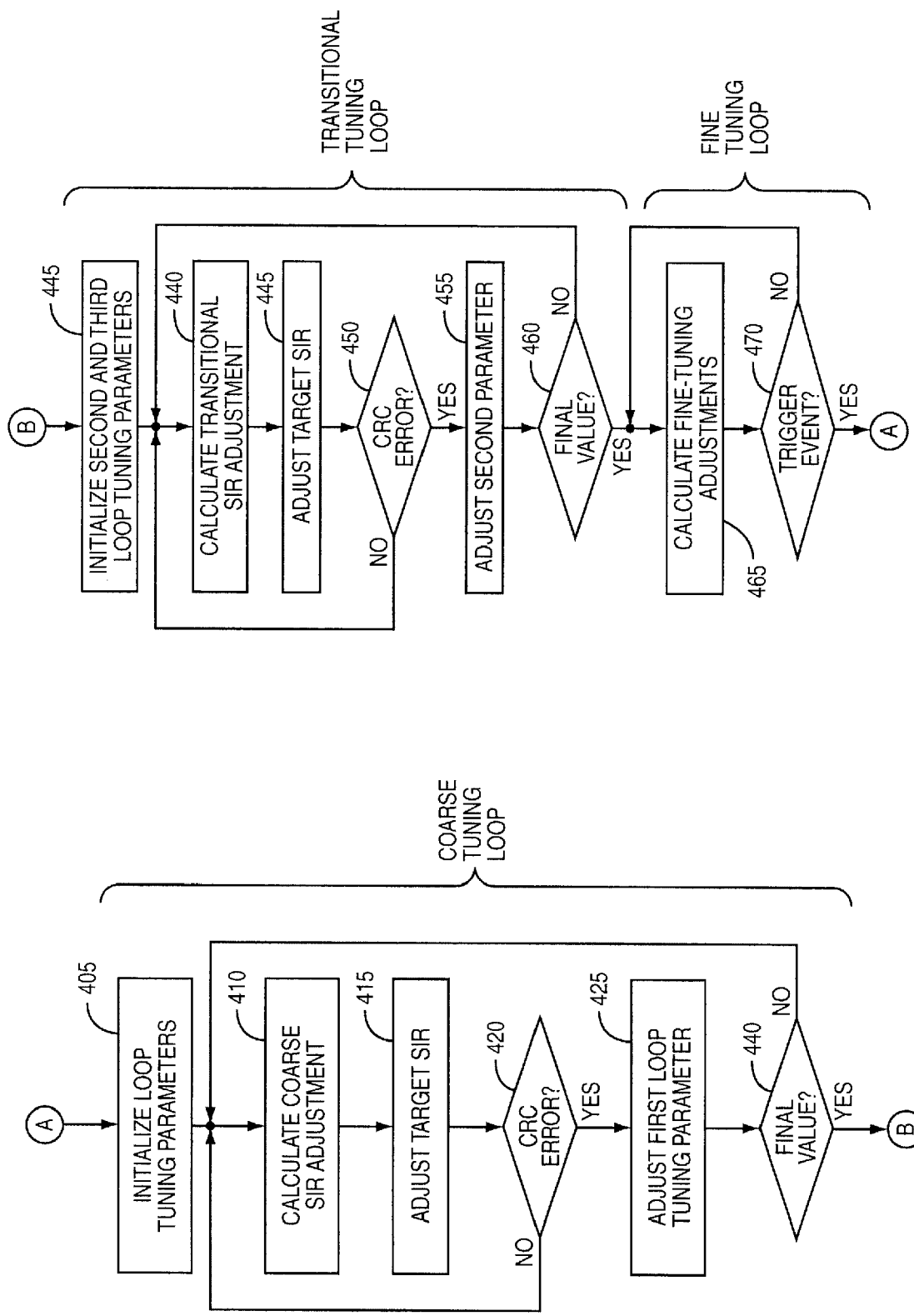
FIG. 4 is a flow diagram of an exemplary outer-loop power control procedure.

FIG. 4 illustrates a multi-stage process for adjusting a target SIR in an outer-loop power control method. Although the method illustrated in FIG. 4 is described here in reference to a particular set of adjustment calculations, namely, Equations (2) to (4), those skilled in the art will appreciate that the illustrated techniques are in fact more general, and may be applied to other calculations for coarse and fine SIR adjustments.

The process of FIG. 4 begins at "A" with the commencement of a coarse tuning mode. At block 405, one or more loop tuning parameters are initialized for the coarse tuning mode. In an embodiment based on Equations (2) to (4), the value for K1 is adjusted to an initial value $K1_{initial}$. In some embodiments, the values for K2 and K3 may be set to very large numbers, so that the contribution from the terms in Equation (4) is minimized. In other embodiments, the terms in Equation (4) may be ignored entirely while in coarse tuning mode.

At block 410, a coarse SIR adjustment is calculated. As was described in detail above, this coarse SIR adjustment may be calculated as a function of a short-term block error rate, a target block error rate, and the first tuning loop parameter. At block 415, the target SIR is adjusted, using the calculated coarse SIR adjustment. In early iterations through the coarse tuning loop, the coarse SIR adjustments will be relatively large, compared to later iterations, since the first tuning loop parameter's initial value is selected to provide larger adjustment steps.

The adjusted target SIR computed at block 415 is used to perform inner-loop power control (not shown), as was described above. Thus, SIR is measured for a recently received block, and this measured SIR is compared to the adjusted target SIR. Based on this comparison, an appropriate TPC command is sent to the remote transmitter for use in adjusting the transmit power.

At block 420, a new block is decoded and checked for errors. If the received block is error free, then control of the loop is passed back to the coarse SIR adjustment calculation at block 410, for further adjustment of the target SIR. Detection of a CRC error at block 420, on the other hand, indicates that the target SIR has converged to a level close to or somewhat below the optimal level. Thus, if a CRC error is detected at block 420, then the first loop tuning parameter is adjusted, at block 425, so that subsequent coarse adjustments are smaller. In an embodiment based on Equation (3), the first loop tuning parameter may be adjusted by simply incrementing the value of K1.

The adjusted value for the first loop tuning parameter is compared to its "final" value, i.e., the value used in fine tuning mode, at block 430. If the value for the first tuning loop parameter has not reached its final value, then control of the loop passes to block 410, for calculation of a new SIR adjustment based on the adjusted value of the first tuning loop parameter. The steps illustrated in blocks 410-430 are thus repeated until the final, fine-tuning, value of the first loop tuning parameter is reached, at which point control passes to a transitional tuning loop at "B".

The transitional tuning loop, pictured in FIG. 4 at blocks 435-460, operates in much the same way as the coarse tuning loop. However, each adjustment to the target SIR in this transitional tuning mode includes at least two parts—a coarse part, based on a measured short-term block error rate for the received signal and the target block error rate, and a transitional part, based on a smoothed block error rate and the target block error rate. In an exemplary embodiment, the coarse part and transitional part are calculated according to Equations (3) and (4), respectively. In this transitional mode, the coarse part is scaled by the final value of the first loop tuning parameter (e.g., $2^{-K1_{fine}}$) The transitional part, however, is calculated using a second tuning loop parameter that is initialized to an initial value (e.g., $2^{-K2_{initial}}$) that differs from the value used in fine tuning mode.

Thus, the second tuning loop parameter is initialized at block 435. In embodiments based on the formulations in Equations (2) to (4), a third tuning loop parameter, $2^{-K3}$, is also initialized. In the embodiment described here, K3 is initialized to the value used for fine tuning mode and is not adjusted during the transitional tuning mode. However, the third tuning loop parameter may be adjusted in other embodiments.

At block 440, a transitional SIR adjustment is calculated. In some embodiments, the adjustment comprises a coarse part and a transitional part, calculated in accordance with Equations (2) to (4). At block 445, the target SIR is adjusted, using the calculated transitional SIR adjustment. As with the coarse tuning loop, the transitional SIR adjustments in early iterations of the transitional tuning loop will usually be larger than in later iterations, because of the subsequent adjustments to the second loop tuning parameter.

The adjusted target SIR computed at block 445 is used to perform inner-loop power control (not shown), as was described above. Thus, SIR is measured for a recently received block, and this measured SIR is compared to the adjusted target SIR. Based on this comparison, an appropriate TPC command is sent to the remote transmitter for use in adjusting the transmit power.

At block 450, a new block is decoded and checked for errors. If the received block is error free, then control of the loop is passed back to the transitional SIR adjustment calculation at block 440, for further adjustment of the target SIR. Detection of a CRC error at block 450, on the other hand, indicates that the target SIR has again converged to a level very close to or somewhat below the optimal level. Thus, if a CRC error is detected at block 450, then the second loop tuning parameter is adjusted, at block 455, so that subsequent coarse adjustments are smaller. In an embodiment based on Equations (2) to (4), the second loop tuning parameter may be adjusted by simply incrementing the value of K2.

The adjusted value for the second loop tuning parameter is compared to its "final" value, i.e., the value used in fine tuning mode, at block 460. If the value for the first tuning loop parameter has not reached its final value, then control of the loop passes to block 410, for calculation of a new SIR adjustment based on the adjusted value of the first tuning loop parameter. The steps illustrated in blocks 410-430 are thus repeated until the final, fine-tuning, value of the second loop tuning parameter is reached, at which point control finally passes to the fine-tuning loop at blocks 465-470.

In fine-tuning mode, the values for the first, second, and third loop tuning parameters may be held fixed, allowing the loop to accurately track the target BLER. If conditions change, however, the entire tuning procedure may need to be repeated. Thus, if a triggering event, such as a change in the target BLER, or a substantial change in channel conditions, is detected, at block 470, then the outer power control loop is restarted, at block 405. Otherwise, the outer power control loop remains in fine tuning mode, at block 465.

Figure 5:
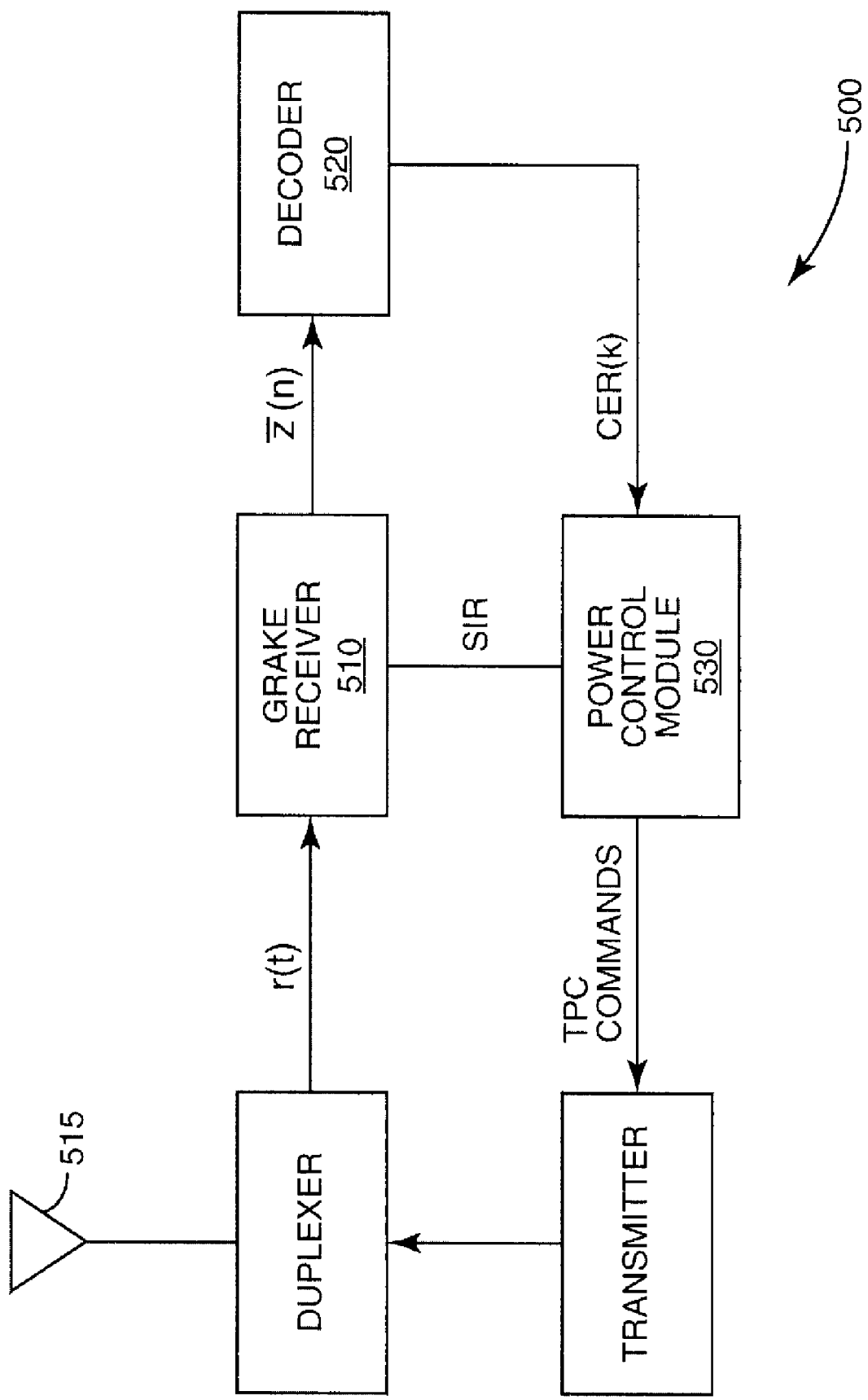
FIG. 5 is a block diagram of an exemplary transceiver configured to perform outer-loop power control in accordance with one or more embodiments of the invention.

FIG. 5 illustrates an exemplary transceiver 500 for implementing one or more of the methods for outer-loop power control described herein. Those skilled in the art will appreciate that the particular design of a transceiver in accordance with the inventive techniques, and the associated nomenclature used in connection with such a receiver, may vary according to the network standard involved, but such variations are not germane to understanding or explaining the present invention. Moreover, it should be understood that the devices and circuitry illustrated and discussed herein are simplified; actual implementations likely will have additional entities that have been omitted, for clarity, from the discussion herein.

Transceiver 500, which may be part of a base station 20 or mobile station 50, comprises a generalized RAKE (GRAKE) receiver 510, decoder 520, and power control module 530. A signal r(t) received by antenna 515 is provided to the GRAKE receiver 510. GRAKE receiver 510 may, for example, comprise a parametric GRAKE receiver, as described in U.S. Patent Application Publication No. 2005/0201447, by Cairns et al. GRAKE receiver 510 demodulates the received signal and provides a vector of the received symbol estimates z(n) to the decoder 520. GRAKE receiver 510 also calculates a current estimate for SIR, and provides it to power control module 530. Decoder 520 decodes the received symbols and generates a current estimate of the block error rate, designated CER(k), which is also provided to the power control module 530. Based on the input from the GRAKE receiver 510 and the decoder 520, the power control module 530 performs inner-loop and outer-loop power control according to one or more of the methods described above.

Figure 6:
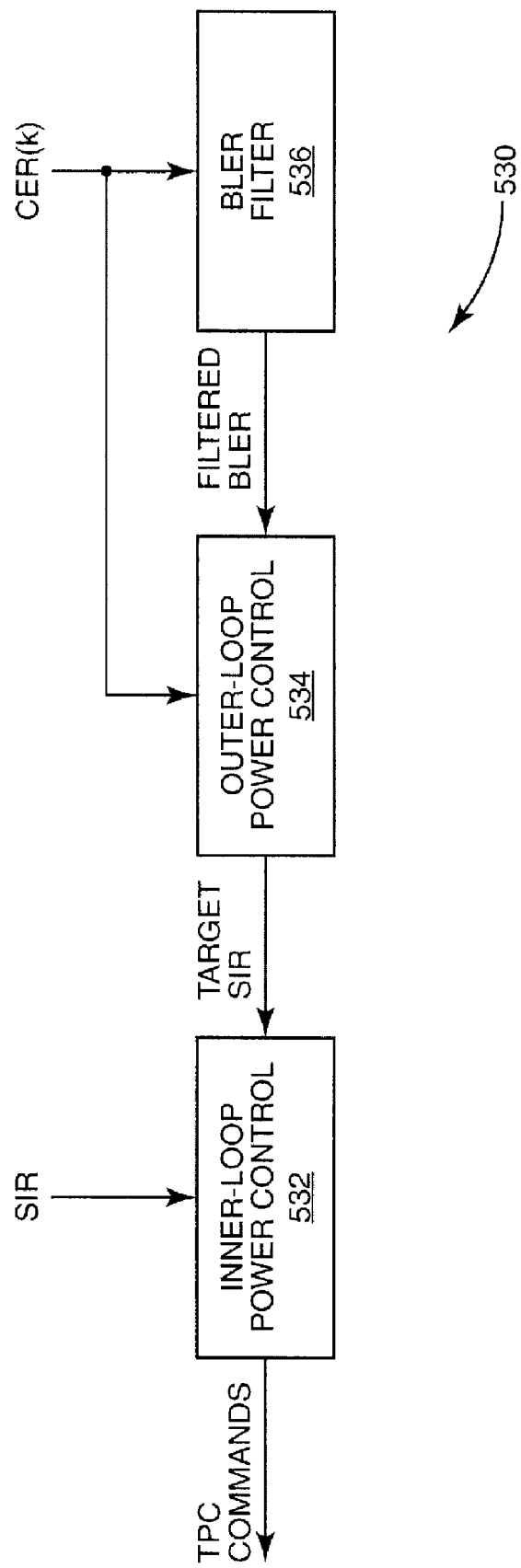
FIG. 6 is a block diagram of an exemplary outer-loop power control unit.

FIG. 6 illustrates the main functional elements of the power control module 530. Power control module 530 comprises a block error rate (BLER) filter 536, an outer-loop power control unit 534, and an inner-loop power control unit 532. As will be readily understood by those skilled in the art, the functional elements shown in FIG. 6 may be implemented by one or more processors, microcontrollers, digital signal processors, or the like.

The BLER filter 536 receives a series of short-term block error rate estimates CER(k) from the decoder 520, and produces a smoothed BLER, corresponding to a time interval greater than a single transmission time interval. In some cases, as discussed above, the effective time constant for BLER filter 536 may correspond to twenty or more transmission time intervals.

The outer-loop power control unit 534 generates an SIR target for the inner-loop power control unit 532, based on at least the short-term block error rate, CER(k), as well as a target block error rate, $BLER_{target}$, provided by a higher-layer control function (not shown). In some embodiments, as was discussed in detail above, the outer-loop power control unit 534 may calculate coarse adjustments to the target SIR based on the short-term block error rate, the target block error rate, and a first tuning loop parameter. In other embodiments, outer-loop power control unit 534 may also calculate fine adjustments to the target SIR based on the smoothed block error rate, the target block error rate, and a second loop tuning parameter. In yet other embodiments, outer-loop power control may be configured to provide a coarse tuning mode, in which a coarse adjustment to the target SIR is calculated for each iteration of a coarse power control loop. The coarse adjustment in each iteration is based on a short-term block error rate for the received signal, the target block error rate, and a first loop tuning parameter, where the loop tuning parameter is varied in one or more steps form an initial value to a final value, in response to the detection of one or more cyclic redundancy check (CRC) errors in the received signal. Upon reaching the final value for the loop tuning parameter, the outer-loop power control unit 534 is configured to transition to a fine tuning mode. This transition may include a transitional tuning mode as well, as was described earlier in reference to FIG. 4.

The inner-loop power control unit 532 uses the target SIR provided by the outer-loop power control unit 534 to perform inner-loop power control. This may comprise comparing the measured SIR provided by the GRAKE receiver 510 to the new target SIR and generating one or more transmit power control (TPC) commands based on the comparison. These TPC commands are then sent to the remote transmitting unit for use in adjusting the transmitted power level.

As will be appreciated by those skilled in the art, the functional elements of FIGS. 5 and 6 may be implemented using various processing circuits, including A/D converters, filters, DSPs or other digital processors, memory, and the like. In at least one exemplary embodiment, outer-loop power control unit 534 includes a processing circuit that includes one or more microprocessor, DSPs and/or Application Specific Integrated Circuits (ASICS), or other programmable devices. This processing circuit may be configured to include processing logic to carry out one or more of the methods described herein and/or illustrated in FIGS. 3 and 4. It should thus be understood that at least a portion of the present invention's functionality may be embodied as stored computer instructions in the form of micro-code, firmware, software, etc.

More generally, the present invention can be implemented in hardware, software, or essentially any combination thereof, according to the needs of a particular design. Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of adjusting a target signal-to-interference ratio, SIR, for use in controlling transmitted power of a signal received from a remote transmitter, the method comprising:
   for each of a plurality of iterations of an outer-loop power control loop:
      measuring a short-term block error rate for the received signal;
      calculating a coarse SIR adjustment as a function of the short-term block error rate, a target block error rate, and a first loop tuning parameter; and
      determining a new target SIR based on a prior target SIR and the calculated coarse SIR adjustment; and
   for one or more of the plurality of iterations:
      computing a smoothed block error rate for an interval corresponding to two or more transmission time intervals; and
      calculating a fine SIR adjustment as a function of the smoothed block error rate, the target block error rate, and a second loop tuning parameter;
      wherein determining the new target SIR is further based on the fine SIR adjustment.

2. The method of claim 1, wherein the fine SIR adjustment is further calculated as a function of a prior fine SIR adjustment scaled by a third loop tuning parameter.

3. The method of claim 1, further comprising, for each of the plurality of iterations:
   measuring a current SIR for the received signal;
   comparing the current SIR to the new target SIR; and
   generating one or more transmit power control commands for transmitting to the remote transmitter, based on said comparing.

4. The method of claim 1, wherein the first loop tuning parameter is varied in one or more steps from an initial value to a final value, in response to detecting one or more cyclic redundancy check, CRC, errors in the received signal.

5. The method of claim 4, wherein the first loop tuning parameter comprises an exponential parameter, and wherein the first loop tuning parameter is varied from the initial value to the final value by adjusting the exponent of the first loop tuning parameter by a predetermined amount upon each detection of a CRC error.

6. The method of claim 4, further comprising, for each of one or more of the plurality of iterations after the final value of the first loop tuning parameter is reached:
   calculating a transitional SIR adjustment, comprising a first part based on a smoothed block error rate for an interval corresponding to two or more transmission time intervals, the target block error rate, and a second loop tuning parameter; and
   determining the new target SIR based on the transitional SIR adjustment, the coarse SIR adjustment, and the prior target SIR;
wherein the second loop tuning parameter is varied, in one or more steps, from an initial value to a final value, in response to detecting one or more CRC errors in the received signal.

7. The method of claim 6, wherein the second loop tuning parameter comprises an exponential parameter, and wherein the second loop tuning parameter is varied from the initial value to the final value by incrementing or decrementing the exponent of the second loop tuning parameter by a predetermined amount upon each detection of a CRC error.

8. The method of claim 6, wherein the transitional SIR adjustment further comprises a second part based on a prior value for the transitional SIR adjustment scaled by a third loop tuning parameter.

9. The method of claim 6, further comprising, for each of one or more of the plurality of iterations after the final value of the second loop tuning parameter is reached:
   calculating a fine SIR adjustment based on a smoothed block error rate for an interval corresponding to two or more transmission time intervals, the target block error rate, and the final value for the second loop tuning parameter; and
   determining the new target SIR based on the fine SIR adjustment, the coarse SIR adjustment, and the prior target SIR.

10. The method of claim 9, wherein the fine SIR adjustment further comprises a second part based on a prior value for the fine SIR adjustment scaled by a third loop tuning parameter.

11. The method of claim 9, further comprising, in response to a pre-determined trigger event, re-setting the first loop tuning parameter to its initial value.

12. The method of claim 11, wherein the pre-determined trigger event comprises determining a new target block error rate that differs from the target block error rate by more than a predetermined amount.

13. The method of claim 11, wherein the pre-determined trigger event comprises detecting channel conditions that differ from prior channel conditions by a predetermined amount.

14. The method of claim 4, further comprising, for each iteration of the outer-loop power control loop:
   measuring a current SIR for the received signal;
   comparing the current SIR to the new target SIR;
   generating one or more transmit power control commands for transmitting to the remote transmitter, based on said comparing.

15. A transceiver in a mobile communication network for controlling the transmit power of a signal received from a remote transmitter, comprising
   a decoder configured to measure a short-term block error rate for a received signal;
   a block error rate filter configured to compute a smoothed block error rate for an interval corresponding to two or more transmission time intervals; and
   a power control module comprising an outer-loop power control unit configured to:
      for each of a plurality of iterations of an outer-loop power control loop:
         calculate a coarse SIR adjustment as a function of the short-term block error rate, a target block error rate, and a first loop tuning parameter; and
         determine a new target SIR based on a prior target SIR and the calculated coarse SIR adjustment; and
      for one or more of the plurality of iterations, to:
         calculate a fine SIR adjustment as a function of the smoothed block error rate, the target block error rate, and a second loop tuning parameter; and
         determine the new target SIR based on the fine SIR adjustment, the coarse SIR adjustment, and the prior target SIR.

16. The transceiver of claim 15, wherein the outer-loop power control unit is further configured to calculate the fine SIR adjustment as a function of a prior fine SIR adjustment scaled by a third loop tuning parameter.

17. The transceiver of claim 15, further comprising a receiver configured to measure a current SIR for the received signal and an inner-loop power control unit configured to, for each of the plurality of iterations:
   compare the current SIR to the new target SIR; and
   generate one or more transmit power control commands for transmitting to the remote transmitter, based on the comparison.

18. The transceiver of claim 15, wherein the outer-loop power control unit is configured to vary the first loop tuning parameter in one or more steps from an initial value to a final value, in response to detection of one or more cyclic redundancy check, CRC, errors in the received signal by the decoder.

19. The transceiver of claim 18, wherein the first loop tuning parameter comprises an exponential parameter, and wherein the outer-loop power control unit is configured to vary the first loop tuning parameter from the initial value to the final value by adjusting the exponent of the first loop tuning parameter by a predetermined amount upon each detection of a CRC error.

20. The transceiver of claim 18, wherein the outer-loop power control unit is configured to, for each of one or more of the plurality of iterations after the final value for the first loop tuning parameter is reached:
   calculate a transitional SIR adjustment, comprising a first part based on a smoothed block error rate for an interval corresponding to two or more transmission time intervals, the target block error rate, and a second loop tuning parameter; and
   determine the new target SIR based on the transitional SIR adjustment, the coarse SIR adjustment, and the prior target SIR;
wherein the outer-loop power control unit is further configured to vary the second loop tuning parameter, in one or more steps, from an initial value to a final value, in response to detection of one or more CRC errors in the received signal by the decoder.

21. The transceiver of claim 20, wherein the second loop tuning parameter comprises an exponential parameter, and wherein the outer-loop power control unit is configured to vary the second loop tuning parameter from the initial value to the final value by incrementing or decrementing the exponent of the second loop tuning parameter by a predetermined amount upon each detection of a CRC error.

22. The transceiver of claim 20, wherein the transitional SIR adjustment further comprises a second part based on a prior value for the transitional part scaled by a third loop tuning parameter.

23. The transceiver of claim 20, wherein the outer-loop power control unit is further configured to, for each of one or more of the plurality of iterations after the final value of the second loop tuning parameter is reached:
   calculate a fine SIR adjustment based on a smoothed block error rate for an interval corresponding to two or more transmission time intervals, the target block error rate, and the final value for the second loop tuning parameter; and
   determine the new target SIR based on the fine SIR adjustment, the coarse SIR adjustment, and the prior target SIR.

24. The transceiver of claim 23, wherein the fine SIR adjustment further comprises a second part based on a prior value for the fine part scaled by a third loop tuning parameter.

25. The transceiver of claim 18, wherein the outer-loop power control unit is further configured to re-set the first loop tuning parameter to its initial value in response to a pre-determined trigger event.

26. The transceiver of claim 25, wherein the pre-determined trigger event comprises determining a new target block error rate that differs from the target block error rate by more than a predetermined amount.

27. The transceiver of claim 25, wherein the pre-determined trigger event comprises detecting channel conditions that differ from prior channel conditions by a predetermined amount.

28. The transceiver of claim 18, further comprising a receiver configured to measure a current SIR for the received signal and an inner-loop power control unit configured to, for each of the plurality of iterations:
   compare the current SIR to the new target SIR; and
   generate one or more transmit power control commands for transmitting to the remote transmitter, based on the comparison.

* * * * *